US008213368B2

(12) United States Patent
Hui et al.

(10) Patent No.: US 8,213,368 B2
(45) Date of Patent: Jul. 3, 2012

(54) ADAPTIVE COMPRESSION OF CHANNEL FEEDBACK BASED ON SECOND ORDER CHANNEL STATISTICS

(75) Inventors: Dennis Hui, Cary, NC (US); Leonid Krasny, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 345 days.

(21) Appl. No.: 11/777,671

(22) Filed: Jul. 13, 2007

(65) Prior Publication Data

US 2009/0016425 A1      Jan. 15, 2009

(51) Int. Cl.
*H04W 4/00* (2009.01)

(52) U.S. Cl. ........ 370/329; 370/208; 370/210; 370/437; 375/240; 375/260; 375/267

(58) Field of Classification Search .................. 370/208, 370/252, 329; 375/260, 295, 296, 233, 341
See application file for complete search history.

(56) References Cited

U.S. PATENT DOCUMENTS

| | | | |
|---|---|---|---|
| 6,587,512 B1 * | 7/2003 | Reuven et al. | 375/296 |
| 6,934,677 B2 * | 8/2005 | Chen et al. | 704/200.1 |
| 7,116,725 B2 * | 10/2006 | Ketchum et al. | 375/295 |
| 7,139,328 B2 * | 11/2006 | Thomas et al. | 375/299 |
| 7,197,282 B2 | 3/2007 | Dent et al. | |
| 2001/0033622 A1 * | 10/2001 | Jongren et al. | 375/267 |
| 2002/0006168 A1 | 1/2002 | Lee et al. | |
| 2004/0042427 A1 | 3/2004 | Hottinen | |
| 2004/0246928 A1 * | 12/2004 | Choi et al. | 370/335 |
| 2005/0058095 A1 * | 3/2005 | Sadri et al. | 370/329 |
| 2006/0056335 A1 | 3/2006 | Lin et al. | |
| 2006/0056531 A1 | 3/2006 | Li et al. | |
| 2006/0056533 A1 | 3/2006 | Molisch et al. | |
| 2006/0114816 A1 | 6/2006 | Maltsev et al. | |
| 2006/0203708 A1 | 9/2006 | Sampath et al. | |
| 2006/0233272 A1 * | 10/2006 | Raghavan et al. | 375/260 |
| 2007/0153731 A1 * | 7/2007 | Fine | 370/329 |

FOREIGN PATENT DOCUMENTS

WO      2006029261      3/2006

OTHER PUBLICATIONS

Mondal, Bishwarup et al. "Channel Adaptive Quantization for Limited Feedback MIMO Beamforming Systems." IEEE Transactions on Signal Processing, vol. 54, No. 12, Dec. 2006, pp. 4717-4729.
Foschini, Gerard J. "Layered Space-Time Architecture for Wireless Communication in a Fading Environment when using Multi-Element Antennas." Bell Labs Technical Journal, Autumn 1996.
Gersho, Allen. "Asymptotically Optimal Block Quantization." IEEE Transactions on Information Theory, vol. IT-25, No. 4, Jul. 1979.
Gersho, Allen et al. Vector Quantization and Signal Compression. Springer, 1991. Chapter 8.

(Continued)

*Primary Examiner* — Ricky Ngo
*Assistant Examiner* — Rasheed Gidado
(74) *Attorney, Agent, or Firm* — Coats & Bennett, P.L.L.C.

(57) ABSTRACT

A method of variable rate vector quantization reduces the amount of channel state feedback. Channel coefficients of a communication channel are determined and second order statistics (e.g., variances) of the channel taps are computed). Bit allocation for the channel taps are determined based on the coefficients statistics. The channel taps are individually quantized at rates determined based on said bit allocations.

52 Claims, 8 Drawing Sheets

OTHER PUBLICATIONS

Goldsmith, Andrea J. et al. "Capacity of Fading Channels with Channel Side Information." IEEE Transactions on Information Theory, vol. 43, No. 6, Nov. 1997.
Gray, Robert M. et al. "Quantization." IEEE Transactions on Information Theory, vol. 44, No. 6, Oct. 1998.
Kim, Thanh Tung et al. "Combining Short-Term and Long-Term Channel State Information over Correlated MIMO Channels." in Proceedings ICASSP 2006, vol. 4, May 2006.
Love, David J. et al. Equal Gain Transmission in Multiple-Input Multiple-Output Wireless Systems. IEEE Transactions on Communications, vol. 51, No. 7, Jul. 2003.
Love, David J. et al. "Grassmannian Beamforming for Multiple-Input Multiple-Output Wireless Systems." IEEE Transactions on Information Theory, vol. 49, No. 10, Oct. 2003.
Mukkavilli, Krishna Kiran et al. "On Beamforming with Finite Rate Feedback in Multiple-Antenna Systems." IEEE Transactions on Information Theory, vol. 49, No. 10, Oct. 2003.
Na, Sangsin et al. "Bennett's Integral for Vector Quantizers." IEEE Transactions on Information Theory, vol. 41, No. 4, Jul. 1995.
Roh, June Chul et al. "Design and Analysis of MIMO Spatial Multiplexing Systems with Quantized Feedback." IEEE Transactions on Signal Processing, vol. 54, No. 8, Aug. 2006.
Roh, June Chul et al. "Multiple Antenna Channels with Partial Channel State Information at the Transmitter." IEEE Transactions on Wireless Communications, vol. 3, No. 2, Mar. 2004.
Roh, June Chul et al. "Transmit Beamforming in Multiple-Antenna Systems with Finite Rate Feedback: A VQ-Based Approach." IEEE Transactions on Information Tehory, vol. 52, No. 3, Mar. 2006.
Telatar, I. Emre. "Capacity of Multi-Antenna Gaussian Channels." European Transactions on Telecommunications, vol. 10, No. 6, Nov./Dec. 1999.
Xia, Pengfei et al. "Design and Analysis of Transmit-Beamforming based on Limited-Rate Feedback." IEEE Transactions on Signal Processing, vol. 54, No. 5, May 2006.
Zador, Paul L. "Asymptotic Quantization Error of Continuous Signals and the Quantization Dimension." IEEE Transactions on Information Theory, vol. IT-28, No. 2, Mar. 1982.

* cited by examiner

ADAPTIVE COMPRESSION OF CHANNEL FEEDBACK BASED ON SECOND ORDER CHANNEL STATISTICS

BACKGROUND

The present invention relates generally to the transmission of channel state feedback in a mobile communication network and, more particularly, to a method and apparatus for compressing channel state feedback in an adaptive manner.

The use of multiple antennas at the transmitter and/or the receiver in wireless communication systems has attracted substantial attention over the past decade because of the potential improvement in both coverage and data rate. Unlike single antenna systems, where channel state information does not significantly improve the capacity, substantial gain in capacity can be achieved in multiple antenna systems when accurate channel state information is available at the transmitter. In a frequency-division multiplexing (FDD) system, the receiver typically feeds back channel state information to the transmitter. While assuming perfect channel state information at the transmitter is unrealistic due to the capacity limitation on the feedback channel and its round-trip delay, it has been shown that even partial channel knowledge at the transmitter can provide significant gain in capacity compared to systems that do not take into account channel state information. However, feedback of detailed channel state information consumes valuable bandwidth on the reverse link. Consequently, there is significant interest in designing effective methods of reducing the amount of feedback of channel state information without significantly penalizing the capacity of the reverse link.

One approach to channel state feedback uses unstructured block or vector quantizers (VQs) to reduce feedback of channel state information. Although, in theory, unstructured VQs can attain the optimal achievable compression, the complexity of unstructured VQs grows exponentially with the dimension-rate product. For example, in a MIMO system with 4 transmit and 2 receive antennas, the dimension of the unstructured VQs being proposed in the literature can be as large as 4*2*2 (real and imaginary parts of each channel tap coefficient)=16. The storage and computational requirement of large dimension unstructured VQs can be prohibitively high in practice for quantization resolutions (or source coding rates) that achieve reasonable accuracy.

Apart from computational complexity, another problem with unstructured VQs is their inability to adapt to different channel statistics. Most proposed quantization techniques for compressing channel state feedback assume that the MIMO channel taps are independent and identically distributed (IID) across spatial dimensions. In practice, however, the statistical distribution of MIMO channels is often highly correlated spatially and across frequency. VQs designed based on the IID assumption may not provide the desired performance over the wide range of channel statistics typically found in wireless environments. On the other hand, designing an unstructured VQ to account for all possible distributions of the channel taps while maintaining reasonable quantization accuracy is not practical.

Accordingly, there is a need for methods of compressing channel state feedback that can be adapted for different distributions of the channel taps while maintaining reasonable accuracy and complexity.

SUMMARY

The present invention relates to a method and apparatus for feeding back detailed channel information using adaptive vector quantizers. The method and apparatus use second order channel statistics (e.g., variance) to compress the feedback of the instantaneous response of a spatially correlated MIMO channel. Multiple low-dimensional vector quantizers (VQs) of different resolution (or rates) quantize different complex-valued channel tap coefficients. The resolution of each VQ is adaptively selected based on the variance of the corresponding channel tap. By using different quantization resolutions for channel taps with different significance, the distribution of quantization points can be made similar to that of an optimal unstructured VQ designed for the particular channel statistics, which results in nearly optimal performance with much lower computational and storage complexity.

In one exemplary embodiment, both the compressed feedback of the instantaneous channel response and the channel statistics are fed back to the transmitter. The compressed feedback of the instantaneous channel response is fed back over a fast feedback channel. The channel statistics are fed back to the transmitter over a slow feedback channel, which sends back information from the receiver much less frequently than the fast feedback channel. In an alternate embodiment, useful when the noise spectrum is relatively flat across the frequency spectrum, all or part of the required channel statistics may be computed directly at the transmitter based on the assumption that the channel statistics of the forward and reverse channels are reciprocal.

In some embodiments, the channel taps may be transformed into a different domain before quantizing the channel estimates. For example, in an embodiment suitable for MIMO-OFDM systems, the channel response estimated in the frequency domain may be transformed into time domain channel taps. The time-domain channel taps that fall within a predetermined delay spread are selected and then further transformed across the spatial dimension into the "eigen"-domain. The resulting transformed coefficients are quantized individually using quantizers of different rates (or resolutions) adaptively computed according to the variances of the transformed coefficients.

The channel state feedback is decoded by the transmitter using quantization codebooks of the corresponding rates (or resolutions) to obtain estimates of the transformed coefficients, i.e. quantized transformed coefficients. The rate or resolution of each quantizer is computed in the same manner as in the receiver based on the relative variance of the corresponding transformed coefficient. Subsequently, inverse transformations are applied to the quantized transformed coefficients to obtain a quantized version of the frequency-domain channel response. Based on this channel information, the optimal precoder, per-stream coding rates, and/or channel quality indicator (CQI) at each frequency can be computed at the transmitter.

DETAILED DESCRIPTION

Figure 1:
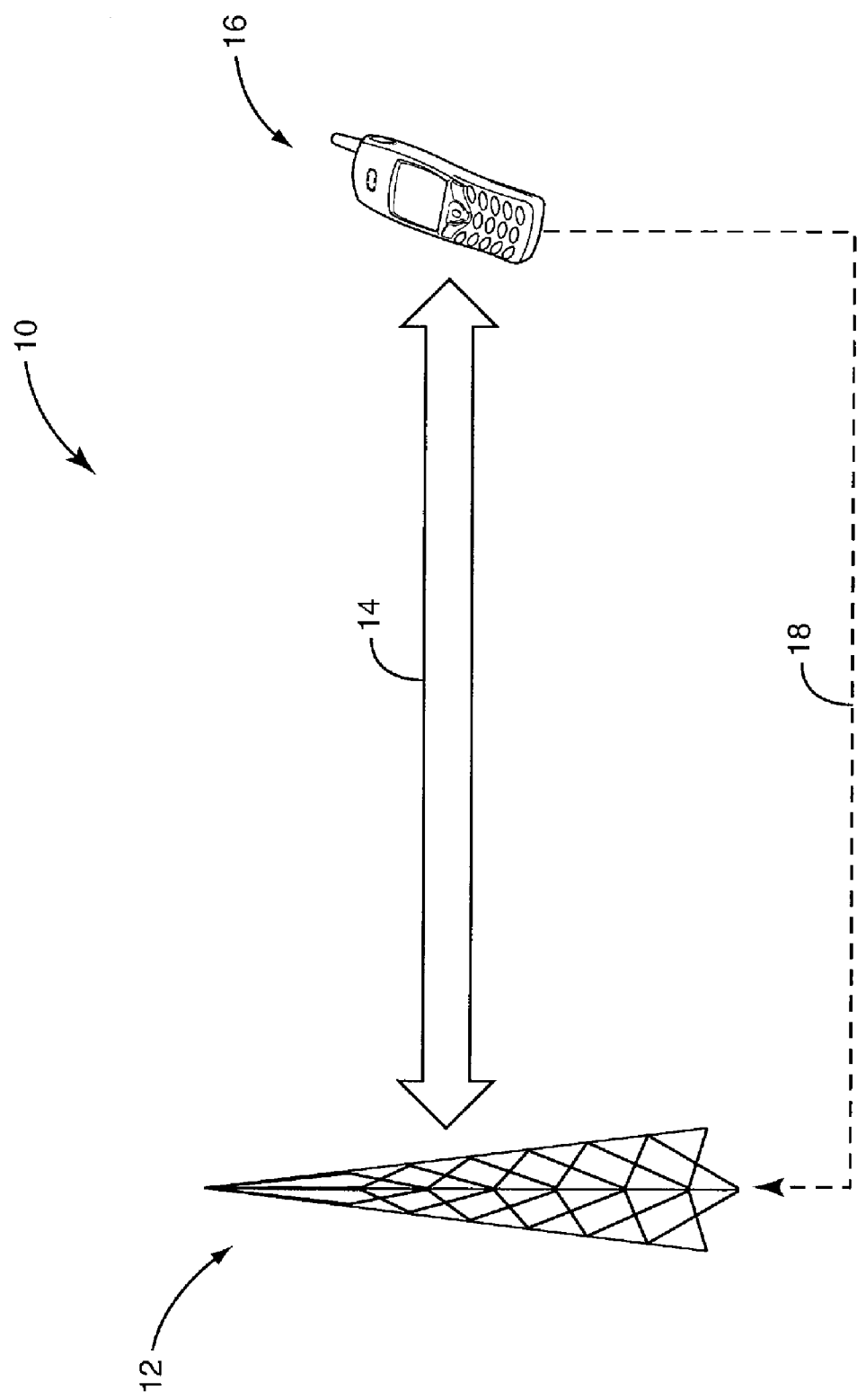
FIG. 1 illustrates an exemplary communication system.

Referring now to the drawings, exemplary embodiments of the present invention are described in the context of a multiple antenna communication system 10 shown in FIG. 1. The multiple antenna communication system 10 may, for example, comprise a multiple-input, single-output (MISO) system, or a multiple-input, multiple-output (MIMO) system. Those skilled in the art will recognize, however, that the principles illustrated by the disclosed embodiments can be applied in other types of communication systems.

The multiple antenna communication system 10 comprises a first station 12 transmitting a signal over a communication channel 14 to a second station 16. The first station 12 is referred to herein as the transmitting station, while the second station 16 is referred to as the receiving station. Those skilled in the art will appreciate that the first station 12 and second station 16 may each include both a transmitter and receiver for bi-directional communications. The link from the transmitting station 12 to the receiving station 16 is referred to as the downlink. The link from the receiving station 16 to the transmitting station 12 is referred to as the uplink. In one exemplary embodiment, the transmitting station 12 is a base station in a wireless communication network, and the receiving station 16 is mobile station. The present invention may be used, for example, to transmit data from the base station 12 to the mobile station 16 on the High Speed Downlink Packet Access (HSPDA) channel in WCDMA systems.

The transmitting station 12 transmits signals from multiple antennas to the receiving station 16, which may include one or more receive antennas. In contrast to single antenna communication systems that employ a single antenna at both the transmitting and receiving stations 12, 16, gains in system capacity can be realized if the transmitting station 12 has detailed knowledge of the channel response for the channel 14 from the transmitting station 12 to the receiving station 16. The receiving station 16 computes estimates of the channel 14 from the transmitting station 12 to the receiving station 16 and transmits channel state feedback to the transmitting station 12 over a feedback channel 18. However, feeding back detailed channel information from the receiving station 16 to the transmitting station 12 consumes valuable bandwidth on the reverse link that could otherwise be used to carry user data. In multiple antenna systems, the amount of the channel state feedback increases drastically with the number of transmit and receive antenna pairs.

Figure 2:
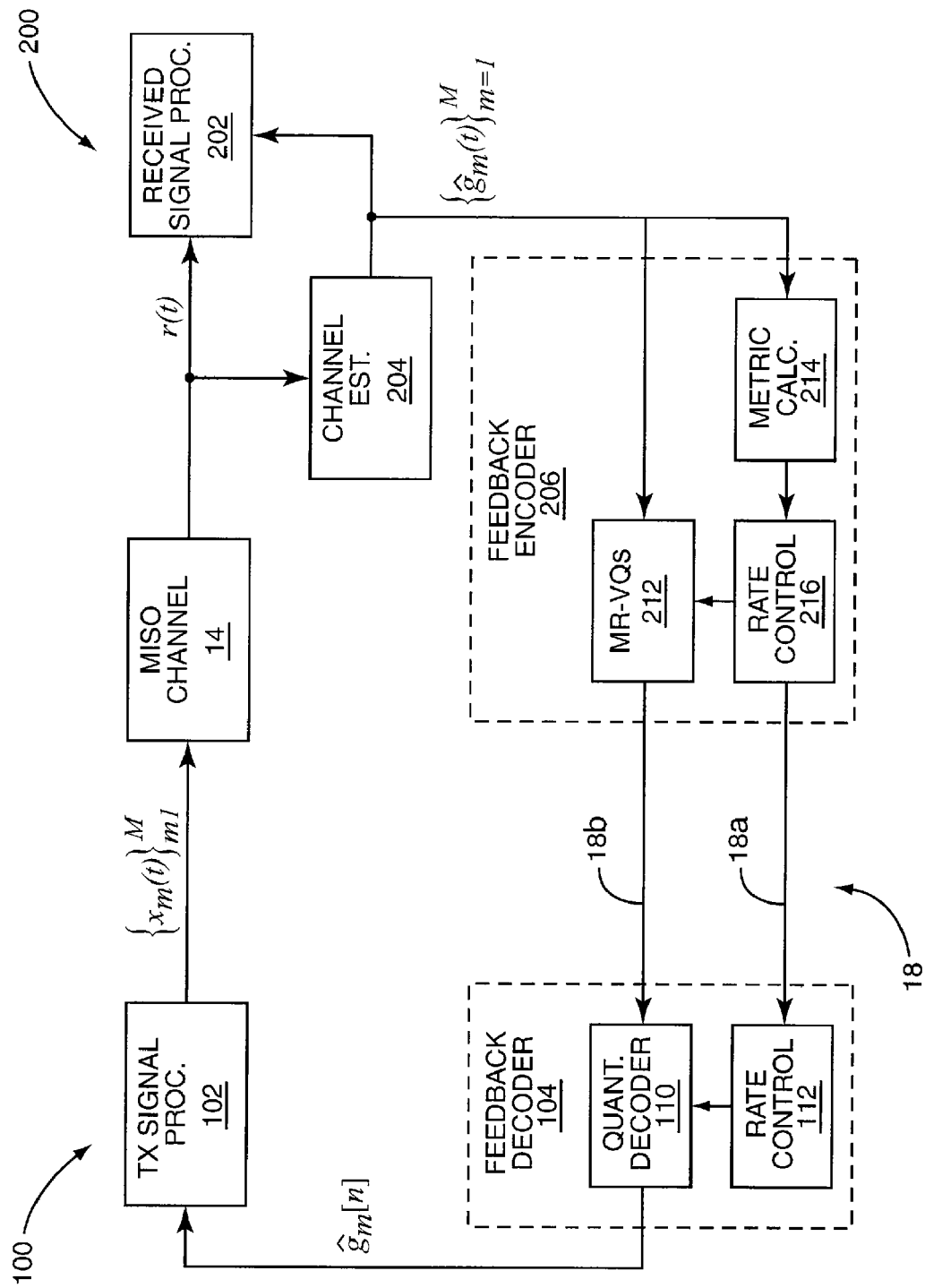
FIG. 2 illustrates an exemplary communication system using an adaptive feedback scheme.

FIG. 2 illustrates an exemplary transmitter 100 at the transmitting station 12 and receiver 200 at the receiving station 16. The receiver 200 uses vector quantization techniques to reduce the channel state feedback. For clarity, it is assumed that the communication system 10 employs multiple antennas at the transmitting station 12 and a single antenna at the receiving station 16. The principles described herein are easily extended to multiple antennas at the receiving station 16.

The transmitting station 12 (e.g., base station) transmits signals $\{x_m(t)\}_{m=1}^{M}$ generated by a transmit signal processor 102 to the receiving station 16 (e.g., mobile station). There are M downlink channels (one from each transmit antenna). The downlink channels from the transmitting station 12 to the receiving station 16 are assumed to be linear time invariant channels with a channel response $g_m(t)$ in the time domain and $G_m(f)$ in the frequency domain. The baseband signal r(t) received at the receiving station 16 is given by:

$$r(t) = \sum_{m=1}^{M} [x_m(t) * g_m(t)] + v(t), \quad \text{Eq. 1}$$

where * denotes convolution and v(t) is the baseband noise. The $m^{th}$ downlink channel may be modeled as:

$$g_m(t) = \sum_{k=1}^{K} a_{m,k} \delta(t - \tau_k), \quad \text{Eq. 2}$$

where $a_{m,k}$ are the channel coefficients of the channel from the $m^{th}$ antenna and $\tau_k$ are the delays. A channel estimator 204 at the receiving station 16 generates an estimate of the $m^{th}$ downlink channel according to:

$$\hat{g}_m(t) = \sum_{k=1}^{Q} \hat{a}_{m,k} \delta(t - \hat{n}_k T_s), \quad \text{Eq. 3}$$

where m=1, . . . , M and $T_s$ is a sampling interval used to quantize the delays $\tau_k$. Note that Q in Eq. 3 is not necessarily equal to K in Eq. 2. The channel estimates $\{\hat{g}_m(t)\}_{m=1}^{M}$ are provided to a receive signal processor 202 for demodulating the received baseband signal r(t). Additionally, the channel estimates $\{\hat{g}_m(t)\}_{m=1}^{M}$ are input to a feedback encoder 206. The feedback encoder 206 receives the channel estimates $\{\hat{g}_m(t)\}_{m=1}^{M}$ from the channel estimator 204, quantizes the channel coefficients in $\{\hat{g}_m(t)\}_{m=1}^{M}$, and feeds back the quantized channel coefficients to the transmitting station 12.

The estimated channel response $\hat{g}_m(t)$ for the downlink channel from one transmit antenna can be conceptually associated with a discrete-time finite impulse response filter with Q non-zero tap coefficients, e.g., $$\hat{g}_m(t) \leftrightarrow \hat{g}_m[n] = \sum_{k=1}^{Q} \hat{a}_{m,k} \delta[n - \hat{n}_k], \quad \text{Eq. 4}$$

where m=1, . . . , M. Consequently, the problem of communicating $\{\hat{g}_m(t)\}_{m=1}^{M}$ to the transmitting station 12 is equivalent to the problem of communicating $\{\hat{g}_m[n]\}_{m=1}^{M}$.

The embodiment shown in FIG. 2 uses an adaptive quantization technique that assigns a greater number of bits to the more significant channel taps and a lesser number to the less significant channel taps. The bit allocations are adaptively computed based on long term statistics of the channel taps, such as the relative powers or variances of the channel taps, so that a predetermined distortion measure of the resulting quantized channel response is minimized for the total number of available bits. Two logical feedback channels are used: a low-rate feedback channel 18a (the slow feedback channel) to feed back the bit allocation and a higher-rate feedback channel 18b (the fast feedback channel) to feedback the quantized coefficients of the channel taps. In this embodiment, the channel statistics (e.g., variances of the channel taps) are collected before quantization. Information regarding the number of bits allocated for quantization of each channel tap is periodically sent back to transmitting station 12 through the slow feedback channel 18a. Information regarding the quantized version (according to the current bit allocation) of the estimate of each specific channel realization, is sent back periodically through the fast feedback channel 18b.

The feedback encoder 206 includes a plurality of multi-rate or variable rate vector quantizers 212, a metric calculator 214, and a rate controller 216. The variable rate vector quantizers 212 individually quantize the channel coefficients for each channel 14. The rate or resolution of each quantizer 212 is individually selected based on the statistics of the corresponding channel tap. The metric calculator 214 calculates statistics, such as the variance, of each channel tap of each channel 14 and provides the channel tap statistics to the rate controller 216. The channel statistics are computed prior to quantization in this embodiment. The rate controller 216 determines the number of bits allocated to each quantizer 212. The number of bits allocated to a quantizer 212 equates to the rate or resolution of the quantizer 212. The quantized channel coefficients are transmitted to the transmitting station 12 over the fast feedback channel 18b. The bit allocation determined by the rate controller 216 is fed back to the transmitting station 12 over the slow feedback channel 18a. Alternatively, the rate controller 216 can feed back the channel statistics from the metric calculator 214 and the bit allocation can be computed from the statistics at the transmitting station 12.

The feedback decoder 104 at the transmitting station 12 comprises a plurality of quantization decoders 110 and a rate controller 112. The quantization decoders 110 generate estimates of the quantized channel coefficients based on the received bits received on the fast feedback channel 18b. The decoding rate or resolution is determined by the rate controller 112 based on feedback of the bit allocation from the rate controller 216 at the receiving station 16. Alternatively, the rate controller 216 at the receiving station 16 could feed back the statistical metric from the metric calculator 214 and the rate controller 112 at the transmitting station 12 could compute the corresponding bit allocation.

Figure 3:
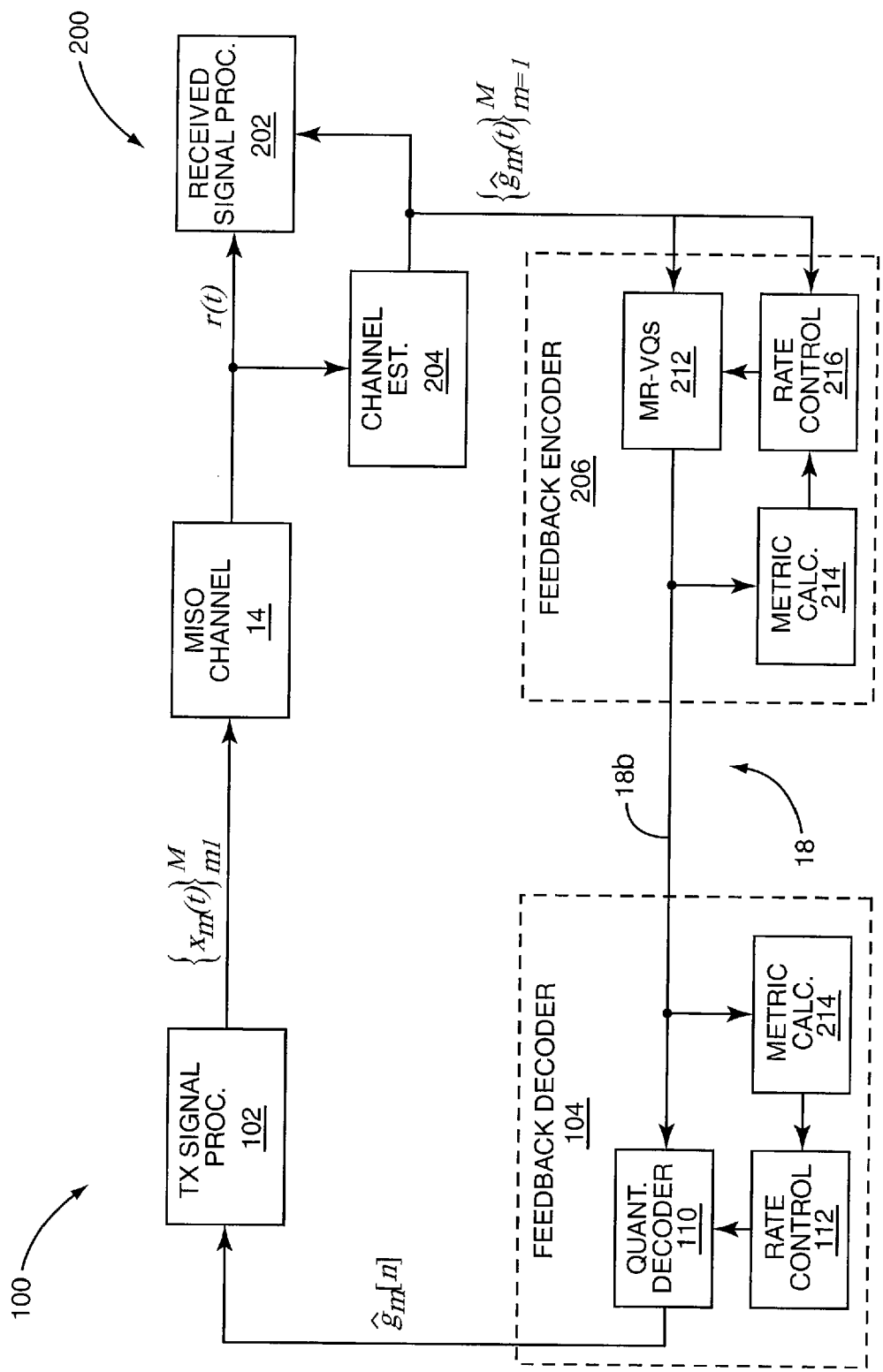
FIG. 3 illustrates an exemplary communication system using an adaptive feedback scheme.

FIG. 3 illustrates an embodiment that eliminates the slow feedback channel 18a. The same reference numbers are used in FIGS. 2 and 3 to indicate components that are the same. In the embodiment shown in FIG. 3, the transmitting station 12 computes the channel statistics of the uplink channel, which is assumed to be the same as the statistics for the downlink channel, and determines the bit allocations from the channel statistics. In this case, the channel statistics are collected after quantization so that the same statistics can be generated at both the transmitting station 12 and receiving station 16. Those skilled in the art will appreciate that the metrics used to compute the bit allocations in a current rate control period will be used to determine the bit allocations in the next rate control period. The metric calculator 214 computes the statistics (e.g., variance) for each channel tap based on the quantized channel coefficients. The variances or other statistics are supplied to the rate controller 216, which determines the bit allocations for the variable rate vector quantizer 212. The feedback decoder 104 at the transmitting station 12 receives the quantized channel coefficients. A metric calculator 214 uses the quantized channel coefficients received in a current rate control period to compute the bit allocations for the next rate control period. The bit allocations computed in the previous rate control period are used by the quantization decoders to determine the estimates of the quantized channel coefficients.

In the embodiments shown in FIGS. 2 and 3, the bit allocation for Q channel taps may be computed so that the mean-squared difference between the estimated channel response and its quantized version is minimized, as described below. Let $\hat{a}_{m,k}^R$ and $\hat{a}_{m,k}^I$ denote the real and imaginary parts of the estimated channel tap $\hat{a}_{m,k}$, respectively, and let $\hat{a}_k = (\hat{a}_{1,k}^R, \hat{a}_{1,k}^I, \hat{a}_{2,k}^R, \hat{a}_{2,k}^I, \ldots \hat{a}_{M,k}^R, \hat{a}_{M,k}^I)^T$ denote the $k^{th}$ vector channel tap. Let $Q_k(\bullet)$ denote a vector quantizer 212 of dimension 2M with $N_k$ quantization points used to quantize $\hat{a}_k$. The source coding rate of $Q_k(\bullet)$ is defined as $R_k = (2M)^{-1} \log_2 N_k$, which denotes the number of bits allocated to quantize each (real-valued) element of $\hat{a}_k$. The goal is to find the optimal bit allocation vector $R = (R_1, R_2, \ldots, R_Q)$ so as to minimize the sum of mean-squared distortions of all channel taps given by:

$$D(R) = \sum_{k=1}^{Q} D(R_k). \qquad \text{Eq. 5}$$

The distortion $D(R_k)$ for a channel tap is given by:

$$D(R_k) = E\|\hat{a}_k - Q_k(\hat{a}_k)\|^2. \qquad \text{Eq. 6}$$

The above optimization problem is difficult to solve exactly since the distortion $D(R_k)$ is a highly non-linear function of $R_k$. However, a good, approximate solution can be derived using the Bennett-Zador-Gersho asymptotic formula for $D(R_k)$ given by:

$$D(R_k) \approx 2^{-2R_k} \sigma_k^2 \gamma_k, \qquad \text{Eq. 7}$$

where $k = 1, 2, \ldots, Q$, $\sigma_k^2$ is the variance of vector channel tap $\hat{a}_k$, and $\gamma_k$ is a quantity that depends on the joint probability density $p_k(\bullet)$ of $\hat{a}_k$ and some design characteristics of the quantizer $Q_k(\bullet)$. Substituting Eq. 7 into Eq. 5 reveals that the components of the optimal vector R that minimizes D(R) are given by:

$$R_k = R + \frac{1}{2} \log \frac{\sigma_k^2 \gamma_k}{\left(\prod_{j=1}^{Q} \sigma_j^2 \gamma_j\right)^{1/Q}}, \qquad \text{Eq. 8}$$

for $k = 1, 2, \ldots, Q$. The term $$R = Q^{-1} \sum_{k=1}^{Q} R_k$$

denotes the average number of bits allocated per vector channel tap.

Assuming that the elements of $\{\hat{a}_k\}$ are identically distributed for all k except for their variance (e.g., $p_k(x) = \sigma_k^{-2M} p(x/\sigma_k)$ for all k for some normalized density function $p(x)$) and that the quantizers $\{Q_k(\bullet)\}$ for all k have the same design characteristics, then $\{\gamma_K\}$ are identical for all k. In this case, Eq. 8 simplifies to:

$$R_k = R + \log \frac{\sigma_k}{\left(\prod_{j=1}^{Q} \sigma_j\right)^{1/Q}}, \qquad \text{Eq. 9}$$

for $k = 1, 2, \ldots, Q$.

In order to quantize the channel tap coefficients at different rates according to their variances, the receiving station 16 and transmitting station 12 must store, respectively, the encoders 206 and decoders 104 of multiple quantizers of different source coding rates. Since the rates computed using Eq. 9 may not exactly match the available rates, certain rounding operations may be performed when computing the rates $\{R_k\}$. To ensure that the overall rates after rounding will not exceed the capacity of the feedback channel 18, one can compute the rates for the channel taps sequentially as:

$$R_k = \frac{QR - \sum_{j=1}^{k-1} \hat{R}_j}{Q - k + 1} + \log \frac{\sigma_k}{\left(\prod_{j=k}^{Q} \sigma_j\right)^{1/(Q-k+1)}}, \quad \text{Eq. 10}$$

where k=1, 2, . . . , Q and $\hat{R}_j$ denotes an approximation of $R_j$ due to rounding. It may be observed that where $\hat{R}_j = R_j$ for all j=1, 2, . . . , k−1, $R_k$ computed by Eq. 9 and Eq. 10 will be the same. To ensure good performance, it is preferable to compute the rates in the descending order of the corresponding channel-tap variances and to use rounding-up operations so that the dominant channel taps are assured of an adequate number of bits.

The computation of bit allocations according to Eqs. 8 and 9 represent one exemplary embodiment of the invention, which is based on the ratio of the standard deviation $\sigma_k$ of each channel tap to the geometric mean of standard deviation of all channel taps. Other variations of the invention include the computation of bit allocations based on the arithmetic mean of some function of the variances of the channel taps according to:

$$R_k = R + f_k(\sigma_k^2) - \frac{1}{Q} \sum_{j=1}^{Q} f_j(\sigma_j^2), \quad \text{Eq. 11}$$

where k=1, 2, . . . , Q and $\{f_j(\bullet)\}_{j=1}^{Q}$ denotes a set of monotonically increasing functions. For example, when $f_k(x) = \log(\gamma_k x)/2$, Eq. 11 is the same as Eq. 8. Alternatively, when $f_k(x) = \sqrt{x}$ for all k, the bit allocation is computed based on the relative magnitude of the standard deviation $\sigma_k$ of each channel tap with respect to the average standard deviation.

More generally, if s denotes some long-term statistics about the channel response (e.g., in the preferred embodiment, $s = (\sigma_1^2, \sigma_2^2, \ldots \sigma_Q^2)$), the computation of bit allocations for different channel taps can be expressed as:

$$R_k = R + \Delta_k(s) - \frac{1}{Q} \sum_{j=1}^{Q} \Delta_j(s), \quad \text{Eq. 12}$$

where k=1, 2, . . . , Q and $\Delta_k(\bullet)$ denote some bit allocation function designed for the $k^{th}$ channel tap. Eq. 12 can be computed sequentially according to:

$$R_k = \frac{QR - \sum_{j=1}^{k-1} \hat{R}_j}{Q - k + 1} + \Delta_k(s) - \frac{1}{Q - k + 1} \sum_{j=k}^{Q} \Delta_j(s), \quad \text{Eq. 13}$$

where k=1, 2, . . . , Q and $\hat{R}_j$ denotes an approximation of $R_j$ due to rounding.

As mentioned above, in order to implement the invention, the transmitting station 12 and receiving station 16 must implement multiple encoders and decoders with different rates and distortion levels so that different levels of quantization can be provided according to the measured statistics. Alternatively, one can use a single tree-structured vector quantizer (TSVQ) to provide different levels of quantization. The encoder for a TSVQ stores a balanced encoding tree of hyperplanes of depth d−1, i.e. each node of the trees, indexed by a bit sequence b∈$\{0,1\}^{d-1}$, corresponds to the normal (column) vector $p_b$ of a multidimensional hyperplane and a threshold $\eta_b$. For example, the depth of the tree may be chosen as d=2MQR. Given an (estimated) vector channel tap $\hat{a}_k$, the encoding process begins at the root node of the tree with the corresponding hyperplane (p,η) and calculates:

$$b[1] = q_1(p^T \hat{a}_k - \eta), \quad \text{Eq. 14}$$

where $q_1(x)$ denotes a one-bit scalar quantizer whose output equals one if x>0 or zero if x≦0. At the next level, the encoder 206 computes $$b[2] = q_1(p_{b[1]}^T \hat{a}_k - \eta_{b[1]}) \quad \text{Eq. 15}$$

using the hyperplane $p_{b[1]}, \eta_{b[1]}$ that corresponds to the value of b[1]. The encoder 206 repeats this process at subsequent levels and computes:

$$b[n] = q_1(p_{b_{n-1}}^T \hat{a}_k - \eta_{b_{n-1}}), \quad \text{Eq. 16}$$

where b=(b[1],b[2], . . . ,b[n−1]), until the number of bits $R_k$ allocated for quantizing $\hat{a}_k$ is reached. At this time, the encoder 206 outputs the $R_k$ bit sequence (b[1],b[2], . . . ,b[$R_k$]) for the vector channel tap $\hat{a}_k$.

Upon receipt of the encoded bit sequence (b[1], b[2], . . . ,b[$R_k$]), the decoder 104 of TSVQ generates a quantized channel tap $\hat{a}_k$ based on a decoding tree of depth d whose nodes at each level contain quantized channel taps with the corresponding level of quantization. The hyperplane used at each level depends on the output bits computed at the previous levels. In addition, the hyperplanes used in a TSVQ (along with the corresponding decoding tree of quantized vectors) are designed to match the statistical distribution of $\hat{a}_k$.

In a practical communication system, the channel taps may vary slowly from one feedback time instant to another. Thus, differential quantization of the channel taps may be used. In this case, the principles described herein can operate in conjunction with any differential quantization scheme to quantize the changes in the channel taps from one time instant to another.

The principles of the present invention can be applied to Orthogonal Frequency Division Multiplexing (OFDM) systems. In an OFDM system, the frequency-domain baseband received-signal may be modeled as:

$$r[k] = H_f[k]s[k] + w[k], \quad \text{Eq. 17}$$

where k=1,2, . . . ,N, $H_f[k]$ is an $n_R \times n_T$ matrix denoting the MIMO channel response, r[k] is the received signal, s[k] is the transmitted signal, and w[k] is the noise-plus-interference component at the $k^{th}$ subcarrier frequency in an OFDM wireless communication system with $n_T$ transmit antennas and $n_R$ receive antennas, respectively. The noise component w[k] is assumed to be statistically independent across frequency, but its covariance matrix, denoted by $R_w[k] \equiv E\{w[k]w[k]^H\}$, may vary with frequency, where E{•} denotes the expected value of the quantity inside the brackets.

The receiving station 16 estimates the channel $\{H_f[k]\}$ and the noise variance $R_w[k]$. The whitened channel response is defined as $$\overline{H}_f[k] = R_w^{-1/2}[k] H_f[k] \quad \text{Eq. 18}$$

for k=1,2, . . . ,N. We assume that certain second-order statistics of $\overline{H}_f[k]$ are available at the transmitting station 12. For example, the second-order channel statistics can be collected at the receiving station 16 by averaging over many realizations observed over a certain time period and then sent to the transmitting station 12 through a slow feedback channel 18a as previously described. Alternatively, when the noise spectrum is relatively flat, at least part of the channel statistics may also be computed directly at the transmitting station 12 using the reciprocal property of channel statistics on forward and reverse channels 14.

Figure 4:
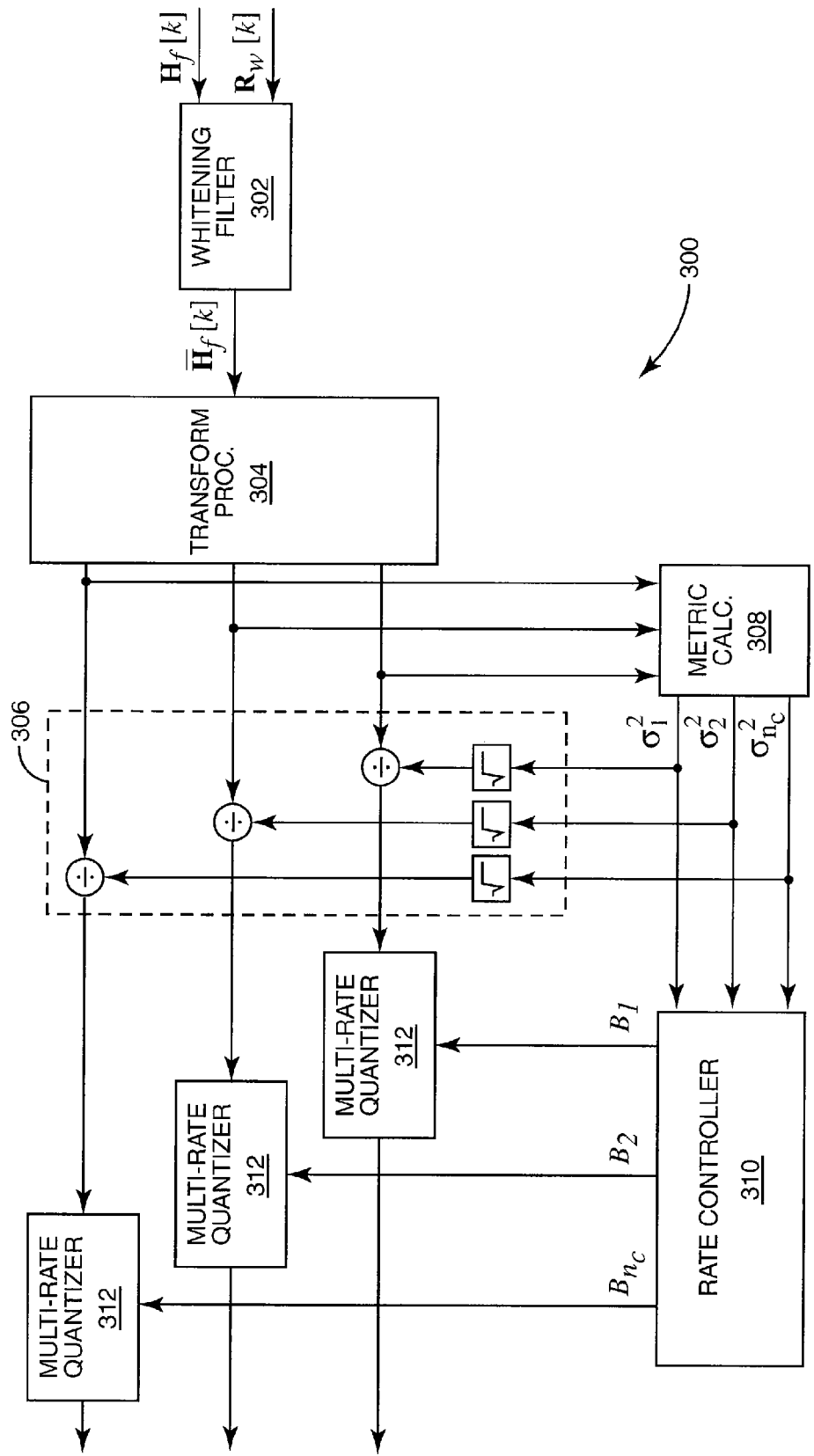
FIG. 4 illustrates an exemplary feedback encoder for an OFDM system.

FIG. 4 illustrates an exemplary feedback encoder 300 for the receiving station 16 in an OFDM system. The feedback encoder 300 includes a whitening filter 302, a transformation processor 304, scaling unit 306, metric calculator 308, rate controller 310, and variable-rate vector quantizers 312. The frequency domain channel response $\{H_f[k]\}_{k=1}^N$ from a channel estimator 204 and the noise covariance matrices $\{R_w[k]\}$ are input to the whitening filter 302. The whitening filter 302 first performs a whitening operation by decorrelating the channel response at each frequency by the corresponding square-root of the noise covariance according to Eq. 18 to generate a whitened channel response $\{\overline{H}_f[k]\}$. The whitened channel response $\{\overline{H}_f[k]\}$ is then transformed by transformation processor 304 as described in more detail below into a vector of complex-valued coefficients $X=(X_1, X_2, \ldots, X_{n_c})$ where $n_c$ denotes the number of transformed channel coefficients. The scaling unit 306 scales the transformed channel coefficients in X by their corresponding standard deviations. The scaled and transformed channel coefficients are then quantized individually by corresponding variable-rate (or variable resolution) vector quantizers 312. The vector quantizers 312 are designed offline for different rates (or resolutions) based on, for instance, zero-mean IID Gaussian samples with unit variance. The vector quantizers 312 may, for example, comprise two-dimensional vector quantizers. Alternatively, higher-dimensional vector quantizers 312 may also be used to quantize two or more transformed coefficients jointly.

The rate (or resolution) used to quantize each transformed coefficient is adaptively selected based on the set of variances of the frequency domain channel coefficients. A metric calculator 308 computes the variances of the transformed channel coefficients. The rate controller 310 determines the bit allocation for each vector quantizer 312 based on the variances of the channel coefficients. For example, given a total bit budget $B_{total}$, the number of bits $B_k$ used to quantize the coefficient $X_k$ may be chosen according to:

$$B_k \cong \frac{B_{total}}{n_c} + \frac{1}{2}\log\left(\frac{\sigma_k^2}{\left(\prod_{j=1}^{n_c}\sigma_j^2\right)^{1/n_c}}\right). \quad \text{Eq. 19}$$

As shown by Eq. 19, the number of bits allocated to a particular coefficient depends on how large its variance is relative to the geometric mean of all the variances. After quantization, the encoded bits are sent to the transmitting station 12 via the fast feedback link 18b.

Figure 5:
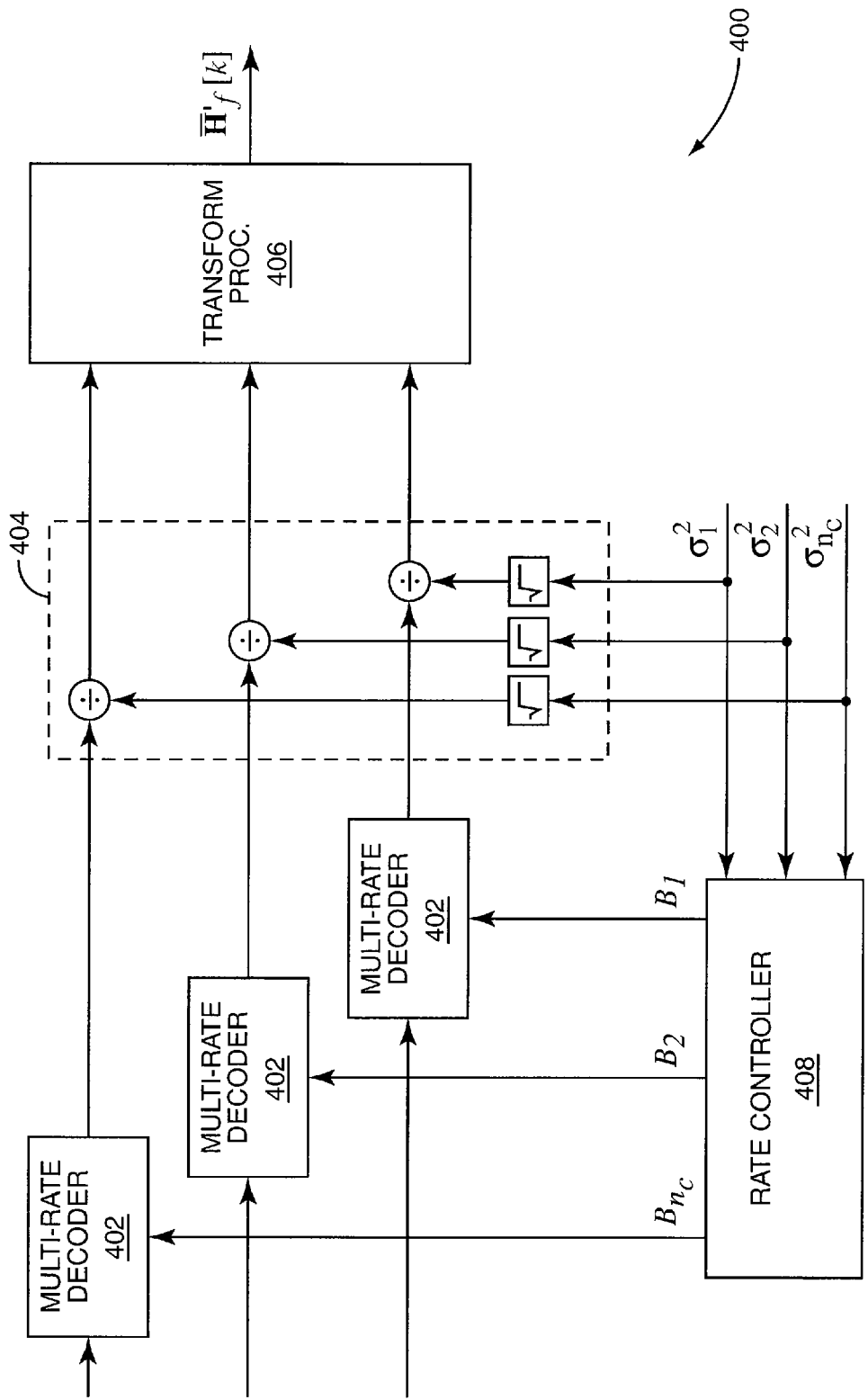
FIG. 5 illustrates an exemplary feedback decoder for an OFDM system.

FIG. 5 illustrates a feedback decoder 400 at the transmitting station 12 for an OFDM system. The feedback decoder 400 reverses the operations applied by the feedback encoder 300 at the receiving station 16 to generate a quantized estimate $\{\overline{H}'_f[k]\}$ of the whitened channel response $\{\overline{H}_f[k]\}$. The feedback decoder 400 includes a plurality of multi-rate decoders 402, scaling unit 404, inverse transformation processor 406, and rate controller 408. Based on the received bits, the quantization decoders 402 generate the estimates of the transformed channel coefficients. The rate controller 408 indicates the bit allocation to each decoder 402, which determines the rate or resolution of the decoder 402. The bit allocations used by the quantization decoders 402 are computed by the rate controller 408 in the same manner as the receiving station 16 based on the relative variances of the transformed coefficients, which in turn can be derived from the statistical information provided by the receiving station 16 over the slow feedback channel 18a. The scaling unit 404 scales the estimates of the transformed channel coefficients by their respective standard deviations. Finally, the inverse transformation processor 406 applies an inverse transform to the scaled reproductions of the transformed coefficients to produce the quantized version $\{\overline{H}'_f[k]\}$ of the whitened channel response $\{\overline{H}_f[k]\}$.

Many important quantities for maximizing the link and the system capacity can be derived from the quantized whitened channel response $\{\overline{H}'_f[k]\}$. For example, the optimal precoder, denoted by P[k], that maximizes the link capacity at the $k^{th}$ frequency can be computed according to:

$$P[k] = U_H[k]D(p_1[k], p_2[k], \ldots, p_{n_T}[k]), \quad \text{Eq. 20}$$

where $U_H[k]$ denotes a matrix whose columns are the eigenvectors of the matrix $\overline{H}'_f[k]^H \overline{H}'_f[k]$ and $D(p_1[k], p_2[k], \ldots, p_{n_T}[k])$ denotes a diagonal matrix with diagonal elements $\{p_j[k]\}_{j=1}^{n_T}$, which are given by:

$$p_j[k] = \begin{cases} \dfrac{1}{\mu} - \dfrac{1}{\lambda_{H,j}[k]} & \text{if } \lambda_{H,j}[k] > \mu \\ 0 & \text{otherwise,} \end{cases} \quad \text{Eq. 21}$$

where j=1,2, . . . ,$n_T$, $\{\{\lambda_{H,i}[k]\}_{j=1}^{n_T}$ is the set of the corresponding eigenvalues of $\overline{H}'_f[k]^H \overline{H}'_f[k]$, and $\mu>0$ is selected such that $$\sum_{j=1}^{n_T} p_j[k] = 1.$$

Moreover, $\{p_j[k]\}$ may also be used as the channel quality indicators (CQI) across different frequencies and different eigen-modes, which are often needed for resource scheduling and link adaptation.

Figures 6, 7:
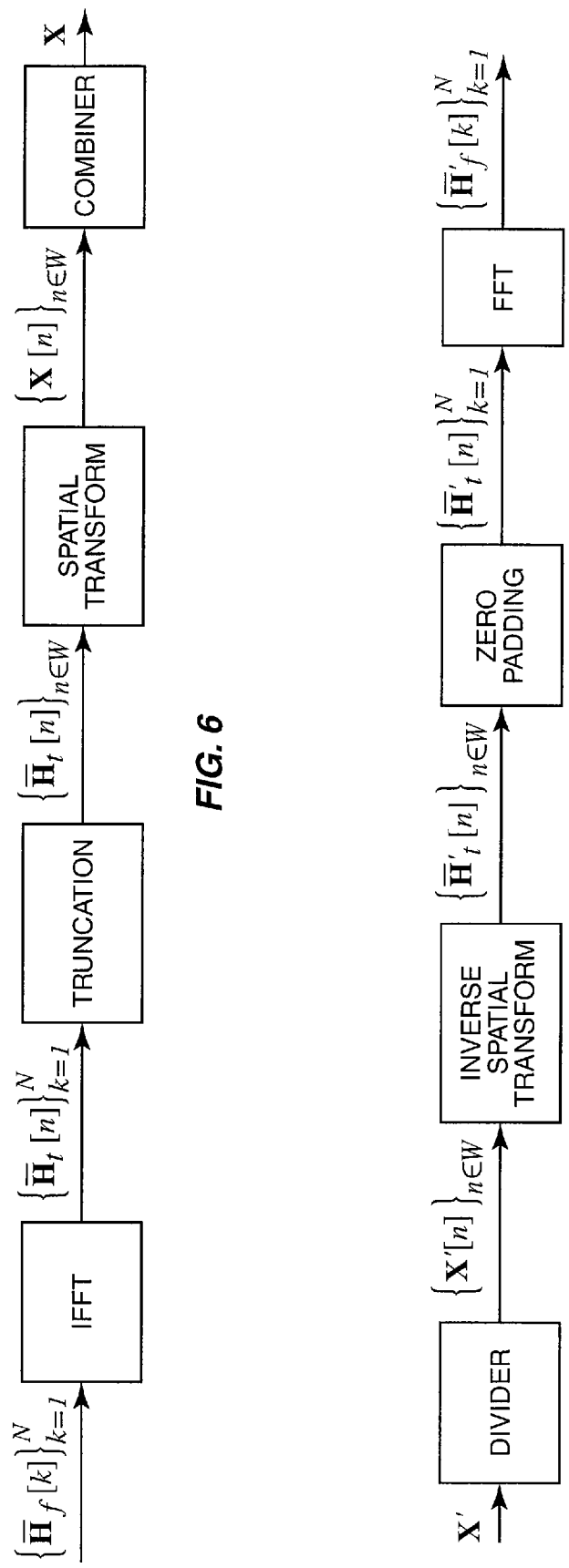
FIG. 6 illustrates an exemplary transformation processor for the OFDM feedback encoder shown in FIG. 4.
FIG. 7 illustrates an exemplary transformation processor for the OFDM feedback decoder shown in FIG. 5.

FIG. 6 illustrates the operation of transformation processor 304 for transforming the whitened frequency domain channel response $\{\overline{H}_f[k]\}_{k=1}^N$. The transformation processor 304 performs a two-dimensional linear transformation of the whitened channel response $\{\overline{H}_f[k]\}_{k=1}^N$ into a vector of transform coefficients X to achieve a substantial compression of the channel coefficients. As shown in FIG. 6, the frequency-domain whitened channel response $\{\overline{H}_f[k]\}_{k=1}^N$ is first converted into a time-domain whitened channel response $\{\overline{H}_f[n]\}_{n=1}^N$ through an inverse fast Fourier Transform (IFFT) operation. Depending on the maximum delay spread of the system, the time-domain response may then be truncated to fewer number of channel taps within a window of time indices, denoted by $W \subset \{1,2, \ldots, N\}$. Each channel tap of the resulting channel response $\{\overline{H}_t[n]\}_{n \in W}$ is further transformed spatially, as described below, to obtain a set of transformed vector channel taps $\{X[n]\}_{n \in W}$, which is then stacked to form the transformed coefficient vector $X=\text{vec}(X[1], X[2], \ldots, X[|W|])$, where $|W|$ denotes the number of indices in W.

According to one of the embodiments of the invention, the spatial transformation is done according to $X[n]=U_{TR}^H \text{vec}(\overline{H}_t[n])$ for all $n \in W$, where $U_{TR}$ denotes a matrix comprising the eigenvectors of the full $n_R n_T$-by-$n_R n_T$ correlation matrix of the whitened channel response, which is given by:

$$\Phi_{full} \equiv E\left[\sum_{k=1}^{N} \text{vec}(\overline{H}_f[k])\text{vec}(\overline{H}_f[k])^H\right], \quad \text{Eq. 22}$$

where, vec(A) denotes a vector formed by stacking all columns of A into a single vector.

The matrix $U_{TR}$ can either be fed back to the transmitting station 12 using the slow feedback channel 18a, or alternatively, it may be estimated using measurements on the uplink. This transformation corresponds to the full Karhunen-Loeve Transform (KLT) on the spatial channel taps. Besides $U_{TR}$, the transmitting station 12 also needs the variance of each component of X[n], which can also be made available to the transmitting station 12 through the slow feedback channel 18a, in order to calculate the proper allocation of source bits for a given bit budget.

According to another exemplary embodiment, the spatial transformation is done according to $X[n]=\text{vec}(\overline{H}_t[n]U_T)$ for all $n \in W$, where $U_T$ denotes the matrix with eigenvectors of the $n_T$ by $n_T$ transmit channel correlation matrix are used instead of the eigenvectors of $\Phi_{full}$. The transmit channel correlation matrix $\Phi_{TX}$ is given by:

$$\Phi_{TX} \equiv E\left[\sum_{k=1}^{N} \overline{H}_f[k]^H \overline{H}_f[k]\right]. \quad \text{Eq. 23}$$

Note that transmit channel correlation matrix $\Phi_{TX}$ can be derived from the full channel correlation matrix $\Phi_{full}$. Specifically, the element of $\Phi_{TX}$ in the $i^{th}$ row and the $j^{th}$ column is given by the trace of the corresponding $n_R$ by $n_R$ submatrix in $\Phi_{full}$, e.g., $[\Phi_{TX}]_{i,j}=\text{tr}\{[\Phi_{full}]_{1+(i-1)n_{RX}:in_{RX},1+(j-1)n_{RX}:jn_{RX}}\}$, where $[A]_{m:n,p:q}$ denotes the (n-m+1) by (q-p+1) submatrix taken from the mth to nth row and from the pth to qth column of the matrix A.

The matrix $U_T$ can either be fed back to the transmitting station 12 using a slow feedback channel 18a, or alternatively, it may be estimated using measurements on the reverse link. Besides $U_T$, the transmitting station 12 also needs the variance of each component of X[n], which can also be made available to the transmitting station 12 through the slow feedback channel 18a, in order to calculate the proper allocation of source bits for a given bit budget.

According to another embodiment, the spatial transformation is done according to $X[n]=\text{vec}(U_R^H \overline{H}_t[n]U_T)$ for all $n \in W$, where $U_R$ denotes the matrix with eigenvectors of an $n_R$ by $n_R$ receive channel correlation matrix given by $$\Phi_{RX} \equiv E\left[\sum_{k=1}^{N} \overline{H}_f[k]\overline{H}_f[k]^H\right]. \quad \text{Eq. 24}$$

The matrix $\Phi_{RX}$ can be derived from $\Phi_{full}$ by summing its diagonal sub-matrices of size $$n_R \text{ by } n_R, \text{ e.g., } \Phi_{RX} = \sum_{i=1}^{n_{TX}} [\Phi_{full}]_{1+(i-1)n_{RX}:in_{RX},1+(i-1)n_{RX}:in_{RX}}.$$

Similar to $U_T$, the matrix $U_R$ can either be fed back to the transmitting station 12 using a slow feedback control channel 18a, or alternatively, may be estimated using measurements on the reverse link. Besides $U_T$ and $U_R$, the transmitting station 12 also needs the variance of each component of X[n], which can also be made available to the transmitting station 12 through the slow feedback channel 18a, in order to calculate the proper allocation of source bits for a given bit budget.

According to yet another embodiment, the spatial transformation is done according to $X[n]=\text{vec}(\overline{H}_t[n]W_N)$, where $W_N$ denotes the IFFT transform matrix whose element at the $i^{th}$ row and the $j^{th}$ column is given by $\exp\{-j2\pi ij/N\}$. In this case, the transmitting station 12 also needs the variance of each component of X[n], which can also be made available to the transmitting station 12 through the slow feedback channel 18a, in order to calculate the proper allocation of source bits for a given bit budget.

At the transmitting station 12, an inverse transformation is applied to the reproduced transformed coefficients to obtain a reproduction of the frequency-domain whitened channel response $\{\overline{H}'_f[k]\}$, as depicted in FIG. 7. The quantized transformed vector X' is first divided into a set of quantized transformed vector channel taps $\{X'[n]\}_{n \in W}$. An inverse spatial transform is then applied to each tap X'[n] to produce the corresponding time-domain quantized whitened channel response $\overline{H}'_t[n]$. The whitened channel response $\{\overline{H}'_t[n]\}_{n \in W}$ is then zero-padded to form $\{\overline{H}'_t[n]\}_{n=1}^N$ which is then transformed back into the frequency domain through an FFT operation to generate the domain quantized whitened channel response $\{\overline{H}'_f[k]\}_{n=1}^N$.

Note that the truncation and the zero-padding operations, shown in FIGS. 6 and 7 may be omitted for channel taps that have small variances because for this scenario, no source bit will typically be allocated.

In this subsection, we demonstrate the performance benefit of the invention through a MIMO-OFDM system. The overall system bandwidth is assumed to be 5 MHz with a FFT size of 512. The number of occupied subcarriers is 300, which are equally divided into 25 chunks (12 subcarriers each). The subcarrier spacing is 15 kHz. The performance is simulated with the 3GPP spatial channel model with the pedestrian B channel profile in a micro-cell environment.

Figure 8:
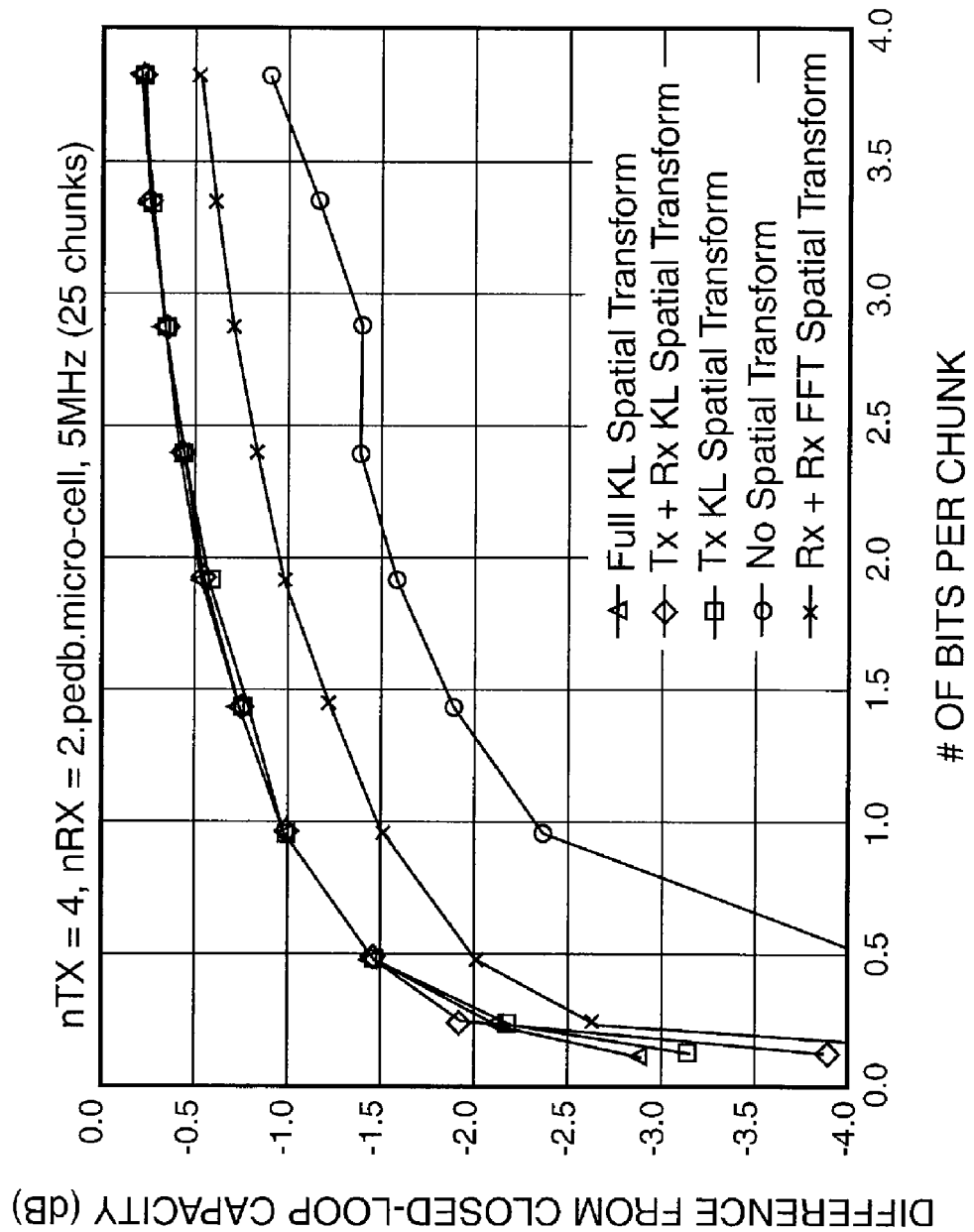
FIG. 8 illustrates the performance of a MIMO system according to the present invention.

FIG. 8 shows the performance of the invention with four transmit antennas and two receive antennas. Specifically, it plots, as a function of the bit budget, the difference in the SNR levels required to achieve a certain ergodic capacity level (e.g., 5 bits per channel use) between the ideal case where the transmitting station 12 has perfect knowledge of the instantaneous channel state and the case where the instantaneous channel state is compressed using the invention before being fed back to the transmitting station 12. The bit budget is normalized according to the number of chunks available in the system. As shown in FIG. 8, exploiting the spatial correlation among different elements of the channel matrix through different spatial transformation is very beneficial in reducing the amount of fast feedback. For example, to achieve within 1 dB of the ideal closed-loop capacity, about 3.5 bits per chunk (for a total of 3.5×25≈63 bits over the whole band)

is required if uneven bit-allocation across is applied only across different time-domain channel taps with no spatial transformation. However, if a fixed FFT transform is applied to each channel coefficient as described in the previous section, less than 2 bits per chunk (for a total of 50 bits over the whole band) is required to achieve within 1 dB of ideal closed-loop performance. Furthermore, if one of the KLT spatial transformation described in the previous section is applied instead, less than 1 bit per chunk (for a total of 25 bits over the whole band) is needed to achieve within 1 dB of the ideal performance. If 2 bits per chunk (for a total of 50 bits) is affordable in the reverse link, one can achieve within 0.5 dB from the ideal closed-loop performance.

Figure 9:
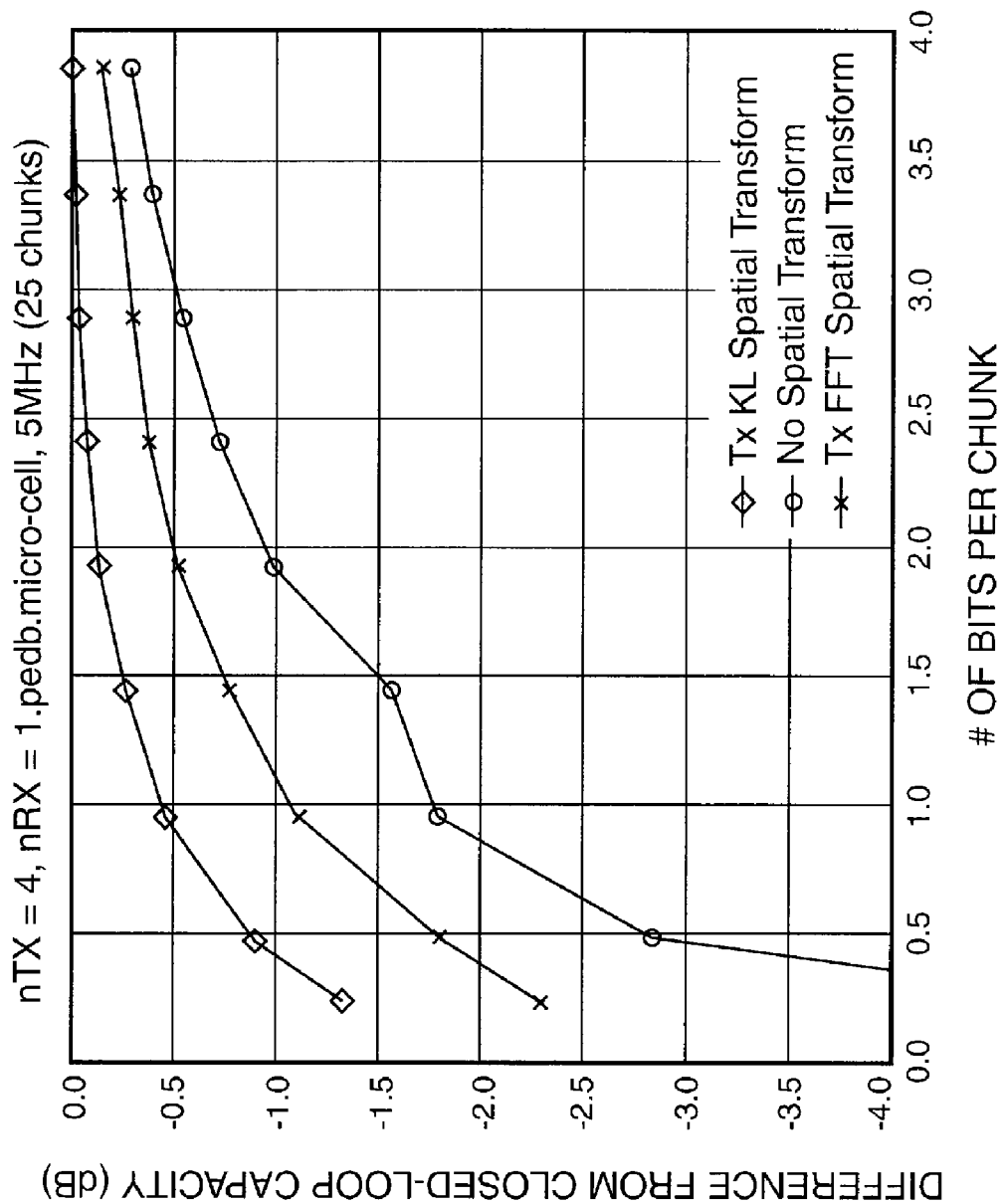
FIG. 9 illustrates the performance of the adaptive feedback scheme illustrated in FIGS. 4 and 5.

FIG. 9 further shows the performance of adaptive feedback scheme illustrated in FIGS. 4 and 5 assuming four transmit antennas and one receive antenna. In this case, if uneven bit-allocation is used only across different time-domain channel taps with no spatial transformation, about 2 bits per chunk (for a total of 2×25≈50 bits over the whole band) is required to achieve within 1 dB of the ideal closed-loop capacity. However, if a fixed FFT transform is applied to each channel coefficient as described in the previous section, about 1 bit per chunk (for a total of 25 bits over the whole band) is required to achieve within 1 dB of ideal closed-loop performance. Furthermore, if one of the KLT spatial transformations described in the previous section is applied, about 0.4 bits per chunk (for a total of 10 bits over the whole band) is needed to achieve within 1 dB of the ideal performance. If 1 bit per chunk (for a total of 25 bits) is affordable in the reverse link, one can achieve within 0.5 dB from the ideal closed-loop performance.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a receiving terminal of quantizing channel state feedback comprising:
   determining individual statistics for a plurality of channel tap coefficients of a communication channel between a transmitting station and said receiving terminal; and
   individually quantizing said plurality of channel tap coefficients at corresponding quantization bit rates that are determined based on said statistics to generate quantized channel tap coefficients, wherein the total number of bits allocated to said plurality of channel tap coefficients is fixed; and
   transmitting said quantized channel tap coefficients from said receiving terminal to said transmitting station in a communication system.

2. The method of claim 1 further comprising transforming said channel tap coefficients to create transformed channel tap coefficients.

3. The method of claim 2, wherein transforming said channel tap coefficients to create transformed channel tap coefficients comprises:
   transforming frequency domain channel tap coefficients into time domain channel tap coefficients;
   selecting time domain channel tap coefficients within a predetermined delay spread; and
   transforming said selected time domain channel tap coefficients to eigen domain channel tap coefficients.

4. The method of claim 1 wherein determining statistics for a plurality of channel tap coefficients comprises determining an individual statistic for each channel tap coefficient.

5. The method of claim 4 wherein the individual statistic comprises the relative power of the channel tap coefficient.

6. The method of claim 5 wherein said rates are determined in descending order of said relative powers.

7. The method of claim 4 wherein the individual statistic comprises the variance associated with the channel tap coefficient.

8. The method of claim 7 wherein said rates are determined in descending order of said variances.

9. The method of claim 1 wherein the rates are determined based on statistics collected in a current rate control period, and wherein said statistics are computed before quantization of the channel tap coefficients in the current rate control period.

10. The method of claim 9 wherein the rates are transmitted over a slow feedback channel, and wherein said quantized channel tap coefficients are transmitted over a fast feedback channel.

11. The method of claim 1 wherein the rates are determined based on statistics collected in a previous rate control period, and wherein said statistics are computed after quantization of the channel tap coefficients in the previous rate control period.

12. The method of claim 11 wherein the quantized channel tap coefficients are transmitted over a fast feedback channel.

13. The method of claim 1 wherein determining said channel tap coefficients includes whitening said channel tap coefficients.

14. The method of claim 1 wherein individually quantizing said plurality of channel tap coefficients at corresponding rates determined based on said statistics comprises scaling said channel tap coefficients based on statistics of said channel tap coefficients and quantizing said scaled channel tap coefficients.

15. The method of claim 1 wherein individually quantizing said plurality of channel tap coefficients at corresponding rates determined based on said statistics comprises:
   determining bit allocations for said plurality of said channel tap coefficients based on said statistics; and
   individually quantizing said plurality of channel tap coefficients at rates determined based on said bit allocations.

16. A feedback encoder in a receiving terminal for quantizing channel state feedback, said feedback encoder comprising:
   a metric calculator to compute individual statistics for a plurality of channel tap coefficients of a communication channel between a transmitting station and said receiving terminal;
   a plurality of multi-rate quantizers to individually quantize said plurality of channel tap coefficients at quantization bit rates that are determined based on said statistics, wherein the total number of bits used by the feedback encoder to quantize the plurality of channel tap coefficients is fixed; and
   a rate controller to determine said rates for said quantizers.

17. The feedback encoder of claim 16 further comprising a transformation processor to transform said channel tap coefficients to create transformed channel tap coefficients.

18. The feedback encoder of claim 17 wherein the transformation processor transforms frequency domain channel tap coefficients into time domain channel tap coefficients, selects said time domain channel tap coefficients within a predetermined delay spread, and transforms said selected time domain channel tap coefficients to eigen domain channel tap coefficients.

19. The feedback encoder of claim 16 wherein the metric calculator determines an individual statistic for each channel tap coefficient.

20. The feedback encoder of claim 19 wherein the individual statistic comprises the relative power of the channel tap coefficient.

21. The feedback encoder of claim 20 wherein the rate controller determines said rates for said channel tap coefficients in descending order of said relative powers.

22. The feedback encoder of claim 19 wherein the individual statistic comprises the variance associated with the channel tap coefficient.

23. The feedback encoder of claim 22 wherein the rate controller determines said rates for said channel tap coefficients in descending order of said variances.

24. The feedback encoder of claim 16 wherein the rate controller determines the rates based on statistics collected in a current rate control period, and wherein said statistics are computed before quantization of the channel tap coefficients in the current rate control period.

25. The feedback encoder of claim 24 wherein the feedback encoder transmits the rate over a slow feedback channel, and transmits quantized channel tap coefficients over a fast feedback channel.

26. The feedback encoder of claim 16 wherein the rate controller determines rates based on statistics collected in a previous rate control period, and wherein said statistics are computed after quantization of the channel tap coefficients in the previous rate control period.

27. The feedback encoder of claim 26 wherein the feedback encoder transmits the quantized channel tap coefficients over a fast feedback channel.

28. The feedback encoder of claim 16 further comprising a whitening filter to whiten said channel tap coefficients.

29. The feedback encoder of claim 17 further comprising a scaling unit to scale said channel tap coefficients based on statistics of said channel tap coefficients prior to quantization.

30. The feedback encoder of claim 16 wherein the rate controller determines bit allocations for said quantizers based on said statistics.

31. The feedback encoder of claim 16 wherein the multirate quantizers comprise an encoder of tree-structured vector quantizers designed based on said statistics.

32. A method implemented in a transmitting station of decoding channel state feedback comprising:
receiving, from a receiving terminal, quantized channel state feedback including a plurality of quantized channel tap coefficients of a communication channel between the transmitting station and the receiving terminal, wherein said plurality of quantized channel tap coefficients are individually quantized and the total number of bits allocated to said plurality of channel tap coefficients is fixed;
determining individual quantization bit rates for said plurality of channel tap coefficients;
decoding said plurality of channel tap coefficients based on said individual quantization bit rates.

33. The method of claim 32 wherein determining corresponding quantization rates for a plurality of channel tap coefficients comprises receiving said quantization rates from a receiving station over a slow feedback channel.

34. The method of claim 32 wherein determining rates for a plurality of channel tap coefficients comprises receiving statistics of said channel tap coefficients from a receiving station over a slow feedback channel, and computing said rates based on said received statistics.

35. The method of claim 34 wherein said received statistics comprise the variances of said channel tap coefficients.

36. The method of claim 32 wherein determining corresponding quantization bit rates for a plurality of channel tap coefficients comprises measuring statistics of said channel tap coefficients and computing said quantization rates for said plurality of channel tap coefficients based on said measured statistics.

37. The method of claim 34 wherein said statistics measured in a first rate control period are used to compute rates in a second rate control period.

38. The method of claim 37 wherein said statistics comprise the variances of said channel tap coefficients.

39. The method of claim 32 further comprising transforming said channel tap coefficients to create transformed channel tap coefficients.

40. The method of claim 37 wherein transforming said channel tap coefficients to create transformed channel tap coefficients comprises transforming said channel tap coefficients into frequency domain coefficients.

41. The method of claim 32 further comprising scaling said channel tap coefficients based on statistics of said channel tap coefficients and decoding said scaled channel tap coefficients.

42. A feedback decoder in a transmitting station for decoding quantized channel tap coefficients fed back by a receiving terminal, said feedback decoder comprising:
a rate controller to determine individual quantization bit rates for a plurality of channel tap coefficients of a communication channel between the transmitting station and the receiving terminal, wherein said plurality of quantized channel tap coefficients are individually quantized and the total number of bits allocated to said plurality of channel tap coefficients is fixed; and
a quantization decoder to decode said plurality of channel tap coefficients based on said individual quantization rates.

43. The feedback decoder of claim 42 wherein said rate controller determines said corresponding quantization rates for a plurality of channel tap coefficients by receiving said quantization rates from a receiving station over a slow feedback channel.

44. The feedback decoder of claim 42 wherein said rate controller determines said corresponding quantization rates for a plurality of channel tap coefficients by receiving statistics of said channel tap coefficients from a receiving station over a slow feedback channel, and computing said quantization rates based on said received statistics.

45. The feedback decoder of claim 44 wherein said received statistics comprise the variances of said channel tap coefficients.

46. The feedback decoder of claim 42 wherein said rate controller determines said corresponding quantization rates for a plurality of channel tap coefficients by measuring statistics of said channel tap coefficients, and computing said quantization rates based on said measured statistics.

47. The feedback decoder of claim 46 wherein said rate controller measures said statistics in a first rate control period and computes said quantization rates based on said measured statistics in a second rate control period.

48. The feedback decoder of claim 47 wherein said statistics comprise the variances of said channel tap coefficients.

49. The feedback decoder of claim 42 further comprising transforming said channel tap coefficients to create transformed channel tap coefficients prior to decoding.

50. The feedback decoder of claim 49 wherein transforming said channel tap coefficients to create transformed channel tap coefficients comprises transforming said channel tap coefficients into frequency domain coefficients.

51. The feedback decoder of claim 42 further comprising scaling said channel tap coefficients based on statistics of said channel tap coefficients and decoding said scaled channel tap coefficients.

52. The feedback decoder of claim 42 wherein the quantization decoder is implemented using a decoder of a tree-structured vector quantizer.

* * * * *

UNITED STATES PATENT AND TRADEMARK OFFICE
CERTIFICATE OF CORRECTION

| | | |
|---|---|---|
| PATENT NO. | : 8,213,368 B2 | Page 1 of 1 |
| APPLICATION NO. | : 11/777671 | |
| DATED | : July 3, 2012 | |
| INVENTOR(S) | : Hui et al. | |

It is certified that error appears in the above-identified patent and that said Letters Patent is hereby corrected as shown below:

On the Title Page, in Field (57), under "ABSTRACT", in Column 2, Line 4, delete "computed)." and insert -- computed. --, therefor.

In Column 1, Line 18, delete "(FDD)" and insert -- (FDM) --, therefor.

In Column 3, Line 35, delete "(HSPDA)" and insert -- (HSDPA) --, therefor.

Signed and Sealed this
Twenty-seventh Day of November, 2012

David J. Kappos
*Director of the United States Patent and Trademark Office*